United States Patent
Butko et al.

(10) Patent No.: US 9,582,731 B1
(45) Date of Patent: Feb. 28, 2017

(54) DETECTING SPHERICAL IMAGES

(71) Applicant: Google Inc., Mountain View, CA (US)

(72) Inventors: Nicholas Butko, Cupertino, CA (US);
Erik Murphy-Chutorian, Palo Alto, CA (US); Evan Rapoport, Los Altos, CA (US); Scott Ettinger, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/686,635

(22) Filed: Apr. 14, 2015

Related U.S. Application Data

(60) Provisional application No. 61/979,940, filed on Apr. 15, 2014.

(51) Int. Cl.
| | |
|---|---|
| *G06K 9/46* | (2006.01) |
| *G06K 9/62* | (2006.01) |
| *G06K 9/80* | (2006.01) |
| *G06T 7/60* | (2006.01) |

(52) U.S. Cl.
CPC ........ *G06K 9/4609* (2013.01); *G06K 9/6215* (2013.01); *G06K 9/80* (2013.01); *G06T 7/602* (2013.01); *G06T 2207/10004* (2013.01); *G06T 2207/20148* (2013.01)

(58) Field of Classification Search
CPC ...... G06K 9/4609; G06K 9/6215; G06K 9/80; G06K 19/04; G06T 7/602; G06T 2207/10004; G06T 2207/20148; H04N 5/2628

USPC .......................... 382/203, 274, 275
See application file for complete search history.

(56) References Cited

U.S. PATENT DOCUMENTS

| | | | | |
|---|---|---|---|---|
| 5,990,941 | A * | 11/1999 | Jackson | G08B 13/19626 348/147 |
| 6,754,400 | B2 * | 6/2004 | Florin | G06T 15/205 345/419 |
| 7,382,399 | B1 * | 6/2008 | McCall | H04N 5/2254 348/207.99 |
| 8,194,993 | B1 * | 6/2012 | Chen | G06T 5/006 348/231.6 |
| 8,217,956 | B1 * | 7/2012 | Jin | G06T 3/60 345/585 |
| 8,368,773 | B1 | 2/2013 | Jin | |
| 8,611,696 | B1 | 12/2013 | Zhu et al. | |
| 2005/0062869 | A1 * | 3/2005 | Zimmermann | G02B 13/06 348/335 |
| 2006/0210146 | A1 * | 9/2006 | Gu | G01B 11/25 382/154 |
| 2013/0069873 | A1 | 3/2013 | Winter | |
| 2013/0124471 | A1 | 5/2013 | Chen et al. | |

FOREIGN PATENT DOCUMENTS

WO   2013109742   7/2013

* cited by examiner

*Primary Examiner* — Daniel Mariam
(74) *Attorney, Agent, or Firm* — IP Spring

(57) ABSTRACT

Implementations relate to detecting spherical images. In some implementations, a computer-executed method includes obtaining an image, examining at least one characteristic of the image, and determining that the image is a spherical image based on the at least one examined characteristic. The method modifies metadata associated with the image to designate the image for spherical display.

20 Claims, 8 Drawing Sheets

DETECTING SPHERICAL IMAGES

RELATED APPLICATIONS

The present application claims priority to U.S. Non-Provisional Application No. 61/979,940, filed Apr. 15, 2014, all of which is incorporated herein by reference in its entirety.

BACKGROUND

The popularity and convenience of digital cameras as well as the widespread use of Internet communications have caused user-produced images such as photographs to become ubiquitous. Some cameras are able to capture or create panoramic images showing wide-angle views of the physical space around the camera. Panoramic images can be created in different ways. For example, views from the camera at different angles around the camera can be captured in succession and/or at about the same time, depending on the number of lenses included in the camera. In some cases, images of adjacent scenes can be stitched together to create a panoramic image. Panoramic images can also be of a variety of different types, including flat, cylindrical, cubic, and spherical. Spherical images can be viewed as if projected onto the inside of a sphere, allowing a full view of the physical space captured around the camera in all directions.

SUMMARY

Implementations of the present application relate to detecting spherical images. In some implementations, a method includes obtaining an image, examining at least one characteristic of the image, and determining that the image is a spherical image based on the at least one examined characteristic. The method modifies metadata associated with the image to designate the image for spherical display.

Various implementations and examples are described. For example, the image can be unassociated with information specifying that the image is spherical, e.g., prior to the modification of the metadata. The modified metadata associated with the image can include information identifying the image as a spherical image and one or more parameters allowing a spherical display of the modified image. The method can further include providing the modified image for spherical display.

Examining at least one characteristic of the image can include examining at least one characteristic of pixels of the image. For example, the method can compare a similarity of pixels of the left and right borders of the image, where determining that the image is the spherical image can include determining that the similarity of pixel values of the left and right borders is above a similarity threshold. The method can examine a pixel value variance along a top border and/or a bottom border of the image, where determining that the image is the spherical image can include determining that the pixel value variance is below a horizontal variance threshold. The method can examine pixels of the image for edges of pixel values similar to one or more predetermined orientations or patterns of edges of pixel values indicating that the image is spherical. The method can measure a pixel value variance along the left border and/or right border of the image, where determining that the image is the spherical image can include determining that this pixel value variance is above a vertical variance threshold.

Examining at least one characteristic of the image can include determining that the image is a candidate spherical image by examining non-pixel characteristics of the image, and examining one or more characteristics of pixels of the image in response to determining that the image is a candidate spherical image. Examining at least one characteristic of the image can include comparing an aspect ratio of the image with one or more stored predetermined aspect ratios of one or more spherical images. Examining at least one characteristic can include examining one or more metadata fields of the image including a camera field indicating a make or model of a camera that captured the image, and comparing the make or model of the camera to a stored list of camera makes and models having an ability to capture or create spherical images. Examining at least one characteristic can include examining a location field of the image indicating an image location where the image was captured, and comparing the location field to one or more geographic locations, where determining that the image is a spherical image can include determining that the image location is different than the one or more geographic locations. Examining at least one characteristic can include examining an altitude field of the image indicating an image altitude at which the image was captured, and comparing the location field to one or more predetermined altitudes, where determining that the image is a spherical image includes determining that the image altitude is higher or lower than the one or more predetermined altitudes. Examining at least one characteristic can include examining a time field of the image indicating an image time at which the image was captured, and comparing the location field to one or more stored predetermined time ranges, where determining that the image is a spherical image can include determining that the image time is within the one or more predetermined time ranges.

In some implementations, a system can include a storage device and at least one processor operative to access the storage device and operative to perform operations. The operations can include obtaining an image, examining at least one characteristic of the image, and determining that the image is a spherical image based on the at least one examined characteristic. The operations include modifying metadata associated with the image to designate the image for spherical display. In various implementations, prior to the modifying of the metadata, the image can be unassociated with information specifying that the image is spherical, and the modified metadata associated with the image can include information identifying the image as spherical and one or more parameters allowing a spherical display of the image. Examining at least one characteristic can include determining that the image is a candidate spherical image by examining non-pixel characteristics of the image, and examining one or more characteristics of pixels of the image in response to finding that the image is a candidate spherical image.

Some implementations can provide a non-transitory computer readable medium having stored thereon software instructions that, when executed by a processor, cause the processor to perform operations. The operations include obtaining an image, examining at least one characteristic of the image, and determining that the image is a spherical image based on the at least one examined characteristic. The operations include modifying metadata associated with the image to designate the image for spherical display. In various implementations, the image can be unassociated with information specifying that the image is a spherical image, and examining at least one characteristic can include determining that the image is a candidate spherical image by examining non-pixel characteristics of the image, and examining one or more characteristics of pixels of the image in response to determining that the image is a candidate spherical image.

DETAILED DESCRIPTION

Figure 1:
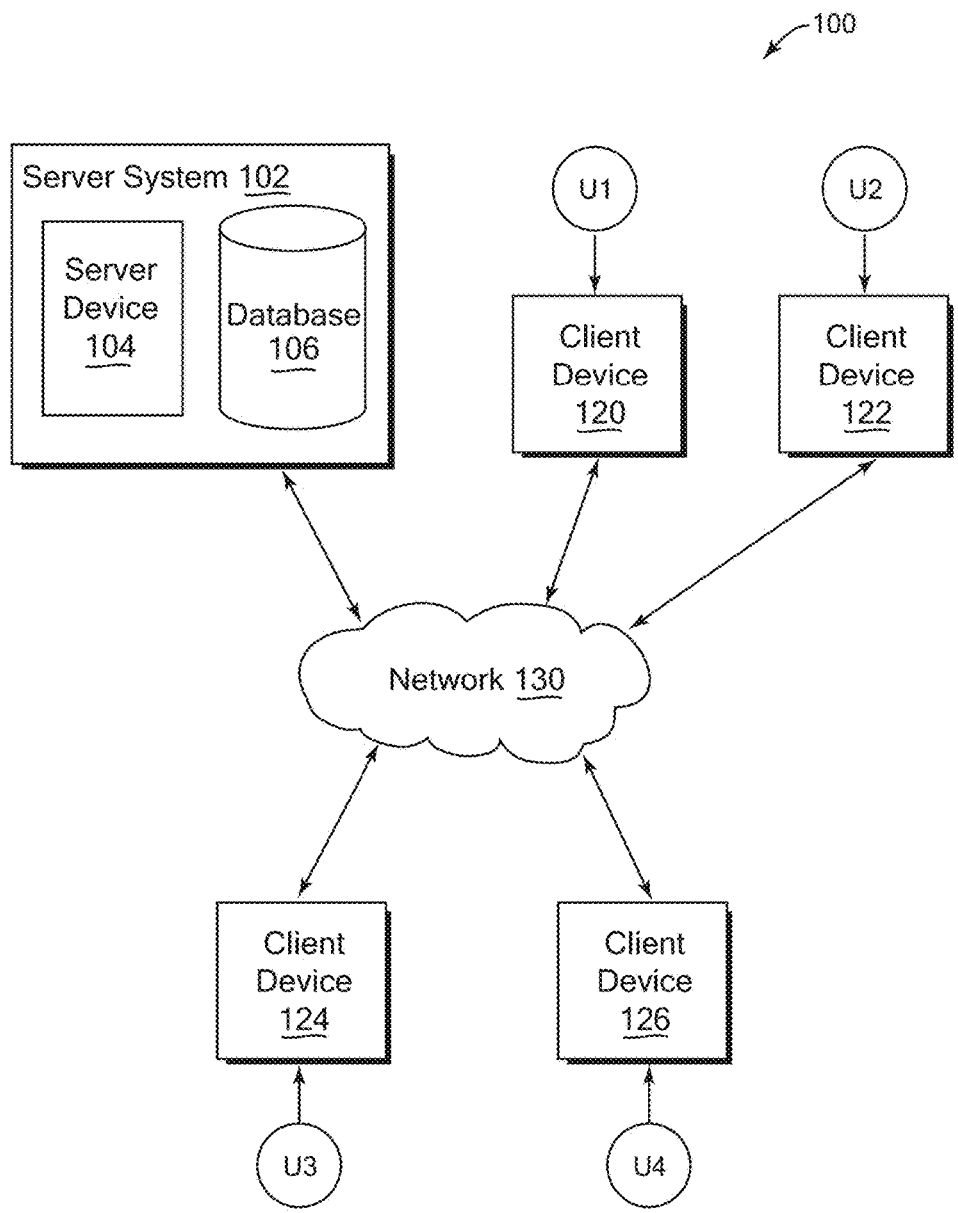
FIG. 1 is a block diagram of an example network environment which may be used for one or more implementations described herein.

One or more implementations described herein relate to detecting spherical images or other types of images. In some implementations, a system can obtain an image, examine at least one characteristic of the image, and determine whether the image is a spherical image or a non-spherical image based on the at least one examined characteristic. In some implementations, if the image is detected to be a spherical image, the method can modify metadata associated with the image to instruct or indicate spherical display of the image.

Various implementations can examine one or more characteristics of images to determine whether the images are intended for spherical display. As one example, metadata characteristics can be examined including geometric information (e.g., aspect ratio), location and time data, etc. and compared with reference data to determine whether an image may qualify as a spherical image. In some implementations, the image may be considered a candidate spherical image. As another example, pixel characteristics of an image can be examined to determine whether the image is a spherical image. In some implementations, various image characteristics of an image can be examined in one operation to identify whether the image is a spherical image. Some implementations can examine one or more image characteristics in a first operation, e.g., to determine whether the image qualifies as a candidate spherical image, and can examine one or more other image characteristics in a second operation, e.g., if the image qualified as a candidate spherical image, to determine whether the image qualifies as a spherical image. These and other described features can provide automatic detection of spherical panoramic images.

Spherical images can provide an immersive viewing experience to a viewer. For example, a spherical image displayed on a 2D display such as a display screen can allow a user to view 360 degrees of a captured scene in many or all directions. For example, in some implementations a user can control a viewing interface to rotate the displayed view left, right, up, and down around the 360 scene captured by the spherical image. The surroundings of the camera at the time of capture of the spherical image can thus be displayed as if the image were projected on the inside of a sphere in which the camera or viewpoint is positioned approximately in the center. Spherical images typically require known special capture and rendering technologies to be implemented.

Spherical images also typically require metadata stored with the images to indicate that they are to be rendered for viewing as if projected on a 3D sphere when presented on a display device in an interface such as a graphical user interface, social network interface, etc. However, some capture devices, processing devices, and/or software do not add the metadata indicating the image is to be rendered as a spherical image. When displayed without 3D sphere rendering, e.g., rendered as a 2D planar/rectangular image, spherical images may appear skewed or otherwise distorted. For example, spherical images may have curved or otherwise distorted depictions of portions of the captured scenes and may not provide an immersive experience for a viewer.

One or more features described herein can allow effective automated detection of spherical images or other types of panoramic images. For example, described features can allow detection of spherical images that do not include metadata specifying that they are intended to be displayed as spherical images by examining one or more characteristics of images. One or more described features can thus be used to cause spherical images to be rendered properly on a display device. For example, features can avoid or reduce distorted presentations of images, e.g., displays of a spherical image having a non-spherical rendering, and/or displays of a non-spherical image having a spherical rendering. A system using features described herein can automatically, accurately, and efficiently provide the immersive quality of displayed 3D panoramic images without requiring manual user activity or intervention to examine images, detect types of images, and add or modify metadata to such detected types of images. Consequently, a technical effect of one or more described implementations is that examination and editing of image data is reduced in time and resources expended to obtain accurate display results.

A spherical image as referred to herein refers to a spherical panoramic image that, when rendered properly, provides an exact or approximate 360 degree spherical view around a viewing point in multiple directions, or a portion of such a full 360 degree view (e.g., an exact or approximate 180 degree or hemispherical view, an exact or approximate 270 degree spherical view, an exact or approximate 90 degree spherical view, etc.), e.g., as if the image were projected on the inside of a sphere. The 2D stored version of the spherical image includes depicted content that appears warped when viewed as a normal 2D image, but which is displayed unwarped in a spherical rendering (e.g., as if the image were wrapped over a sphere in the spherical rendering). For example, the data used to show the spherical view is included in the 2D rectangular spherical image, where the 2D spherical image is warped by a display program (e.g., warped such that the warped features of the 2D image look normal) and is projected onto a 3D spherical surface to provide a 360 degree view of the captured scene (or a portion of a 360 degree view). In some implementations, the type of spherical image can be an equirectangular projection which is stored in a rectangular, 2D form and can be used with methods described herein. Similar methods and/or features can be used in other implementations using other types of projections (e.g., cylindrical, cubic, mercator, etc.).

FIG. 1 illustrates a block diagram of an example network environment 100 which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1, U2, U3, and U4 may interact with each other via a social network service or other type of network service implemented on server system 102. Respective client devices 120, 122, 124, and 126 may transmit communications and data to one or more server systems such as system 102. The server system 102 may provide appropriate data to the client devices such that each client device can receive shared content uploaded to the network service via the server system 102. In some examples, the network service can include any system allowing users to perform a variety of communications, form links and associations, upload and post shared content, and/or perform other functions. For example, a social network service can allow a user to send messages to particular or multiple other users, form social links in the form of associations to other users within the social network system, group other users in user lists, friends lists, or other user groups, post or send content including text, images (including spherical and other panoramic images), video sequences, audio sequences or recordings, or other types of content for access by designated sets of users of the social network service, send multimedia information and other information to other users of the social network service, participate in live video, audio, and/or text chat with other users of the service, etc. In some implementations, a "user" can include one or more programs or virtual entities, as well as persons that interface with the system or network.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen. The user interface may provide, for example, one or more display and editing features described herein. In some implementations, the user interface can also receive user input provided by one or more users via one or more input devices, such as touchscreens, pointing devices (e.g., mouse, joystick, trackball, trackpad, etc.), voice recognition input devices (e.g., including microphone), etc.

Other implementations can use any type of system and service. For example, any type of electronic device can make use of features described herein. Some implementations can provide features described herein on client or server systems disconnected from or intermittently connected to computer networks. In some examples, a client device having a display screen can display images and provide features and results as described herein that are viewable to a user of a device.

Figure 2:
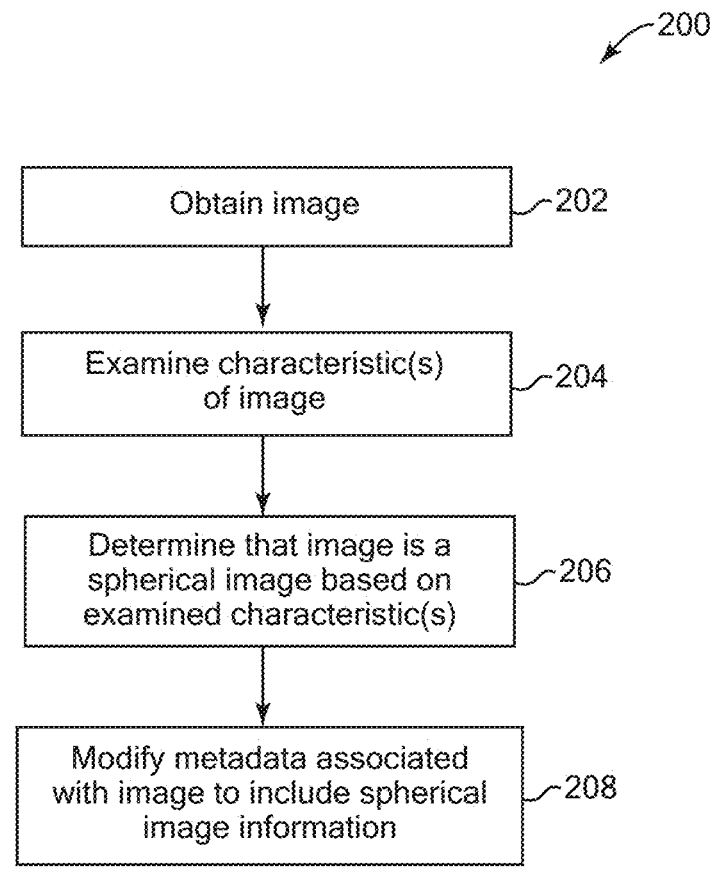
FIG. 2 is a flow diagram illustrating an example method for detecting spherical images, according to some implementations.

FIG. 2 is a flow diagram illustrating one example of a method 200 for detecting spherical images. In some implementations, method 200 can be implemented, for example, on a server system 102 as shown in FIG. 1. In some implementations, some or all of the method 200 can be implemented on a system such as one or more client devices 120, 122, 124, or 126 as shown in FIG. 1, and/or on both server device(s) and client device(s). In described examples, the implementing system includes one or more processors or processing circuitry, and one or more storage devices such as a database 106 or other storage. In some implementations, different components of one or more servers and/or clients can perform different blocks or other parts of the method 200.

In some implementations, the method 200 can be initiated automatically by a system. For example, the method (or portions thereof) can be periodically performed, or performed based on one or more particular events such as one or more images being newly uploaded to or accessible by the system, or one or more conditions specified in custom preferences of one or more users of the system. In some examples, a camera, cell phone, tablet computer, wearable device, or other client device can perform the method 200. Alternatively, a server can process a received image using method 200. Some implementations can initiate method 200 based on user input. A user may, for example, have selected the initiation of the method 200 from an interface such as a social networking interface, application interface, or other interface.

An image as described herein can be a digital image composed of multiple pixels, for example. A spherical image can be presented in 3D panoramic form by a particular display technique, e.g., a displaying device can display a spherical image by displaying its pixels in a predetermined fashion. For example, a portion of the spherical image can be displayed at any one time, and other portions of the spherical image can be displayed over time, e.g., by automatic or predetermined panning and/or tilting over different portions of the spherical image depicting the depicted scene, by user-directed panning and/or tilting, etc. In another example, in some viewing programs a spherical image is displayed so that the image is in motion in a particular direction so that different portions of the captured physical scene are displayed to the viewer over time. In some implementations, a spherical image can be generated which presents a virtual or artificial scene instead of, or in combination with, a scene captured from physical space. In some implementations, spherical images can depict scenes or representations of computer-generated environments, diagrams, or illustrations, e.g., a virtual world, game environment, diagram, painting, imaging scan, etc., where 3D spherical views of such scenes or representations can be displayed. A spherical image can be stored as a planar, rectangular image, e.g., a group of pixels arranged in a rectangular pattern, by converting the spherical image to a rectangular form.

In block 202 of method 200, the method obtains an image for processing. In various implementations, the image can be obtained from a variety of sources, e.g., uploaded by a user to a server over one or more networks, an image from an album or other stored collection of multiple images owned by a user, a database or other storage device, etc. In some implementations, the image can be automatically selected by the method, e.g., as an image from an album or other collection of multiple images of a user. The image can be stored on one or more storage devices of a system or otherwise accessible to the method, e.g., a connected storage device, a local storage device, a storage device connected over a network, etc. For example, an album can be locally stored and accessible by the device performing method 200, and/or can be remotely stored on a server or client device, such as an album provided in an account of a user of a network service. Alternatively, a user can provide or designate one or more images to process.

In some implementations, in methods 200 and 300 described herein, the obtained image does not include any metadata that directly specify that the image is a spherical image (or is a non-spherical image). In some implementations, such metadata is present and associated with the image. In some implementations or cases, the method can directly identify the image as a spherical image based on such metadata and bypass method 200 or 300. In some implementations or cases, if such metadata is present, the method can continue to perform method 200 and/or 300, e.g., to verify that the metadata is correct, to replace incorrect metadata with corrected metadata indicating the image is a spherical image or a non-spherical image, etc.

In block 204, the method examines one or more characteristics of the image. In some implementations, the characteristics can include characteristics of one or more pixels of the image. The characteristics can also or alternatively include metadata associated with the image, such as metadata stored with the image in predetermined fields (or stored separately from the image and in association with the image, e.g., referenced by references or pointers of the image). This metadata can provide characteristics about the image, including (in some implementations) the circumstances or conditions under which the image was captured, stored, or otherwise processed. In some implementations, an image can include metadata about various characteristics of the image, but may not include metadata that specifies that the image is a spherical image. In some implementations, the image can include metadata specifying it is a spherical image or is a non-spherical image.

In block 206, the method determines that the image is a spherical image based on the one or more characteristics examined in block 204. For example, the method can compare pixel characteristics found in the image with known, predetermined patterns or model characteristics. In some implementations, the method can look at various factors and can determine a probability that the image is spherical. For example, some implementations can examine stored image metadata and infer whether the image is a spherical image based on that metadata. Some implementations can use one or more predetermined thresholds, which can be satisfied by one or more determined scores to qualify the image as a spherical image, e.g., if a score exceeds a threshold. Some implementations can use a multi-stage process. For example, in a first stage, a likelihood or probability of the image being a spherical image can be determined. If the probability exceeds a threshold, it can be considered to be a candidate spherical image, and the candidate image can be further analyzed in a second stage, e.g., to more confidently determine whether the image is a spherical image. Some example implementations are described in greater detail below with respect to FIG. 3.

In block 208, the method modifies metadata associated with the image to include information effective to indicate that the image is spherical. For example, the method can add one or more particular metadata fields that cause the image to comply with a particular spherical image protocol or standard, allowing a display process to look for and/or retrieve these fields to render a spherical image properly on a display device. Added metadata can include parameters or other information, e.g., a flag or other information indicating whether to display the image as a spherical image or as some other type of image (e.g., standard rectangular image, cylindrical panoramic image, etc.), the number of component spherical images used to create a full spherical image, starting positions and orientation of the initial view when the spherical image is displayed, the software and or device used to create the spherical image and/or any component images constituting the spherical image, etc. In some examples, the spherical image is a 2D rectangular version of a 3D rendered spherical image, e.g., the spherical image can be stored in a 2D equirectangular format. In some implementations, the spherical image can be a component or portion of a full panoramic spherical image. In such implementations, added metadata can include dimensions (such as offsets and/or coordinates) indicating the position of the component spherical image within the full (rectangular-form) spherical image. Some implementations can modify existing metadata of the image to provide an indication of spherical display for the image and/or provide parameters for spherical display of the image. Some implementations can modify the image in other ways to indicate that it is a spherical image; such modifications can be considered to be metadata of the image as referred to herein.

After block 208, in some implementations, the modified image is provided to one or more display devices to be displayed as a 3D rendered spherical image, e.g., on a 2D display screen. In some examples, the image can be displayed in a viewer application. For example, the viewer application can display a portion of the spherical image at one time in a view of the interface (e.g., a window or other interface portion). In some implementations, the viewer application can move or otherwise change the displayed view (e.g., automatically and/or based on user input) to other portions of the spherical image so that a viewer can view various portions of the spherical image. For example, the view can be moved throughout an entire angular range covered by the image. For example, the viewer application can include directional buttons which can be selected by the user (e.g., based on received user input from other sources such as a pointing device, touch screen, motion sensors, etc.) to cause the displayed view of the spherical image to be moved in accordance with the input.

Figure 3:
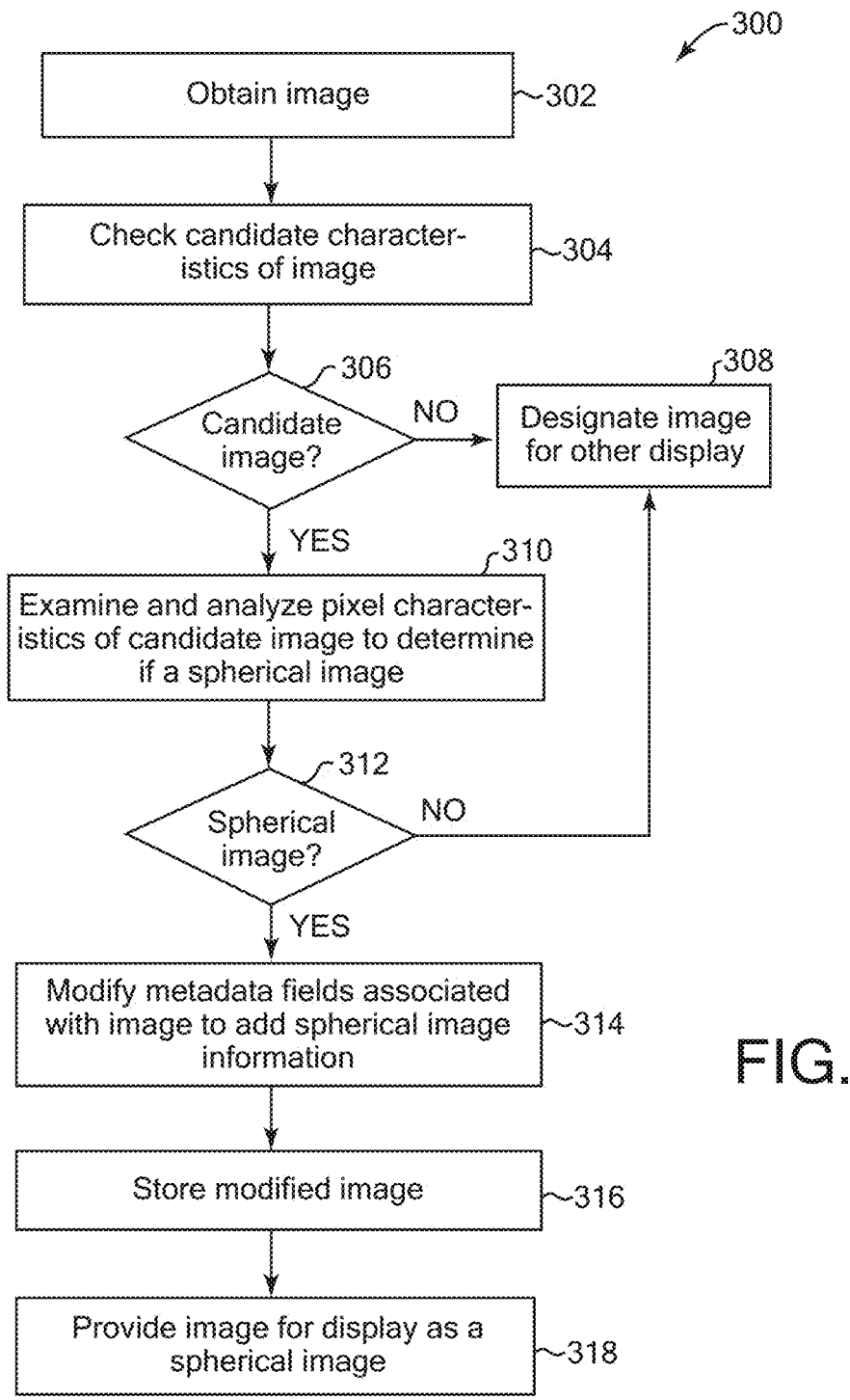
FIG. 3 is a flow diagram illustrating another example method for detecting spherical images, according to some implementations.

FIG. 3 is a flow diagram illustrating an example method 300 implementing method 200 for detecting spherical images, according to some implementations. Method 300 can be implemented by a system such as a server and/or client device as described above for method 200 and initiated similarly as described for method 200.

In block 302, the method obtains an image, e.g., similarly as described above for block 202 of FIG. 2. In block 304, the method checks one or more characteristics (which can be referred to as "candidate characteristics" herein) of the image to determine whether the image is a candidate spherical image. Block 304 can be used in some implementations as an initial check for particular types of "signatures," e.g., particular telltale signs that the image is a spherical image or is a non-spherical image, e.g., to provide a fast initial filter for determination of spherical images. For example, finding candidate characteristics indicating that the image is not a spherical image may allow the method to quickly classify the image as a non-spherical image. In some implementations, the candidate characteristics include non-pixel characteristics of the image that can be determined without examining pixel values of the image. In some examples, image size and metadata can be checked. In some implementations, block 304 can be an asynchronous operation which can be performed in the background without any user waiting on the result of the operation. Some examples of block 304 are described below with reference to FIG. 4.

In block 306, the method checks whether the image is a candidate spherical image based on candidate characteristics as described for block 304. If the image is not a candidate spherical image, the method continues to block 308, in which the image is designated for other type(s) of display besides spherical image display. In some implementations, the image metadata is not modified in block 308; in some other implementations, the image metadata is modified to specify that the image is not a spherical image in block 308. In some implementations, in block 308, the image is not modified and is provided for display and/or storage normally. For example, the image may be displayed in standard rectangular form, or can be processed by other detection methods.

If the image is found to be a candidate image in block 306, then the method continues to block 310, in which the method examines and analyzes one or more pixel characteristics of the image to determine if the candidate spherical image is a spherical image. For example, pixel characteristics can include one or more pixel values (e.g., colors, brightnesses, etc.) of the pixels of the image which are examined to attempt to find values indicating that the image is a spherical image. Some examples of block 310 are described below with reference to FIG. 5.

In block 312, the method checks whether the image was found to be a spherical image in block 310. If not, the method continues to block 308, in which the image is designated for other display as described above. If the image is found to be a spherical image as determined in block 312, then the method continues to block 314 in which the method modifies metadata fields associated with the image to add spherical information. Similarly as described above with respect to block 208 of FIG. 2, various metadata fields can be added or modified to the image that enable the image to be rendered and displayed as a spherical image, including indicators that the image is spherical, parameters describing the creation of the spherical image, dimensions or offsets of the image is a component of a full spherical image, and/or other parameters. In some examples, the added metadata can be serialized and embedded in the spherical image. In some examples, the added metadata can be stored separately and in association with the spherical image, e.g., referenced or pointed to by pointers stored with the image.

In block 316, the method stores the modified image and any modified metadata. For example, the modified image can be stored in storage local to the system performing method 300 (e.g., local memory, magnetic storage, optical storage, etc.), and/or can be stored in remote storage, such as storage accessed over a communication network. In some implementations, the modified image can be stored in an associated user's account on a network service, e.g., a social networking service. For example, the modified image may be viewable only by the owner user of the image, until a user shares the image with other users of a service. In some implementations, the modified image can overwrite the original image obtained in block 302, with or without providing the user an option to write over (or revert to) the original form of the image. In other implementations, the modified image can be automatically shared to other users of a service based on the user's preferences, history of sharing, or other criteria stored by the service.

In block 318, the method provides the image and any associated metadata for display as a spherical image, e.g., causes the image to be displayed. For example, the image can be provided to display processing hardware and/or software of a system to allow display of the spherical image on a display device. In some implementations, a portion of the spherical image can be displayed by a viewing program interface, and different portions of the spherical image can be displayed based on user input, program settings, etc. as described above.

Figure 4:
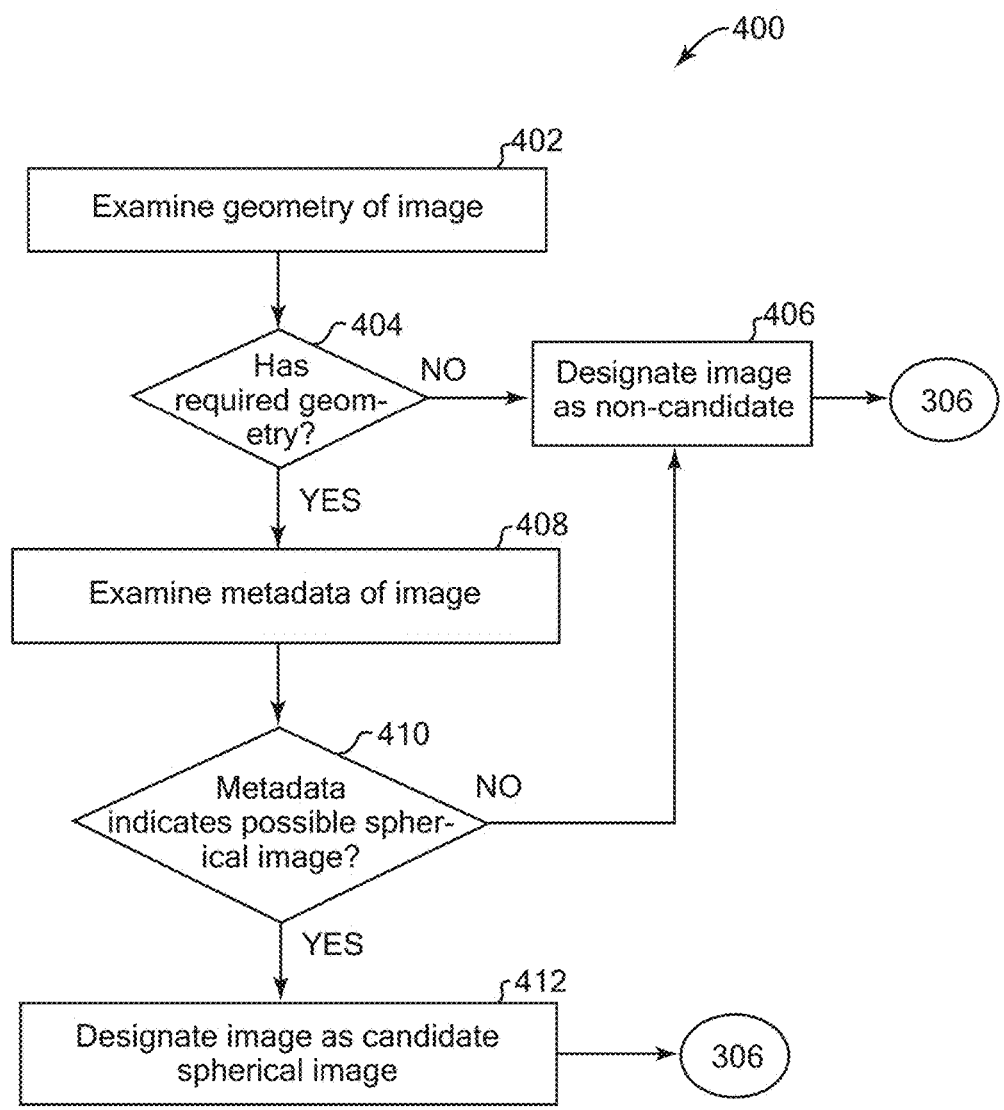
FIG. 4 is a flow diagram illustrating an example method for checking whether an image is a candidate spherical image, according to some implementations.

FIG. 4 is a flow diagram illustrating an example method 400 implementing block 304 of FIG. 3, in which the method checks whether the image is a candidate spherical image, according to some implementations.

In block 402, the method examines the geometry of the image. For example, the method can determine the aspect ratio of the image, such as the ratio of the horizontal length in pixels to the vertical length in pixels. In block 404, the method checks whether the image has a required geometry to qualify as a spherical image. For example, the method can compare the aspect ratio of the image to one or more predetermined, stored aspect ratios used in known spherical image standards or protocols. In some examples, an aspect ratio of 2:1 horizontal length to vertical length can be a required aspect ratio in a particular spherical image standard, where this aspect ratio is used to completely envelop a 360-degree spherical view. For example, the method can compare whether the aspect ratio of the image is the same or similar to (e.g., within a predetermined threshold of) the one or more stored aspect ratios used in known spherical image standards or protocols, and if so, the required geometry for spherical images is considered to be present in the image. In some implementations, other geometrical characteristics of spherical images can be examined and looked for in the image.

If the image does not have the required geometry as checked in block 404, the method continues to block 406, in which the method designates the image as a non-candidate spherical image (e.g., a non-spherical image). In some implementations, the method then returns to block 306 of FIG. 3, e.g., as the next block of method 300. If the image does have the required geometry to qualify as a spherical image as checked in block 404, the method continues to block 408, in which the method examines metadata of the image. For example, the examined metadata can be standard metadata often associated with images captured by cameras and other devices, such as Exif metadata. As described above, in typical use of method 400, no metadata is present that directly specifies that the image is a spherical image.

Some of the metadata of the image may be able to indirectly indicate that the image is more likely to be a spherical image than not, and so can help qualify the image as a candidate spherical image. For example, the method can look for metadata that describes a make and model of the camera that captured the obtained image (or that captured multiple component images constituting the obtained image). In some implementations, the method can look for metadata that is location data describing a geographical location at which the image was captured or created, metadata that is altitude data describing an altitude at which the image was captured or created, and/or metadata describing a time/date at which the image was captured or created.

In block 410, the method checks whether examined metadata indicates that the image is a possible spherical image. For example, the method can compare the camera make and model from the image to a stored list of camera makes and models which are known to have the ability to capture or create spherical images. If there is a match, the method knows that the image might be a spherical image, and if there is not a match, the method knows that the image is less likely to be a spherical image.

In some implementations, the method can analyze location data associated with the image, e.g., retrieved from the image metadata. The location data can, for example, indicate the geographical location at which the image was captured (or created, modified, etc.). In some implementations, if the image was captured or created in a geographical location of a particular type, the method can consider the image to more likely be a spherical image than if the image were captured in other locations. For example, if the image was captured or created in a geographical location remote from cities or towns as determined by this metadata, the method can consider the image to more likely be a spherical image than if the image were captured in a local location to the user, an urban location, an indoor location, etc., e.g., a city, town or location within a building. In some examples, remote locations can be determined as being located a predetermined distance or more from city limits or town limits. For example, such city, town, local, and remote geographical locations can be obtained for comparison from one or more geographic location databases accessible to the method, e.g., stored in local memory or other storage device, accessible over a network or via an online service, etc. In some implementations, the image can be considered more likely to be a spherical image if the image location is different than commonly-travelled locations of a user associated with the image. For example, the method can compare the location indicated by the image metadata to the user's commonly-traveled locations (e.g., home, work, school, stores for shopping, and other commonly-visited locations, e.g., locations travelled to previously by the user a predetermined number of times or more by the user and/or visited by the user for a length of time above a threshold amount of time), if such information is available to method 400. For example, such information can be available (e.g., with permission from the user) from a social networking service or other network service in which the user has an account, GPS location data derived from GPS sensors provided on a user-carried device (e.g., camera, phone, or other device of the user), other sensor data indicating user locations, etc. In some implementations, spherical images can be panoramic which may be more likely to be captured in remote and/or wilderness locations, and/or may be more often captured on a vacation or trip of the user outside common or routine locations visited by the user. In another example, if the image was captured or created at a geographical location, region or landmark (e.g., a tourist attraction) where the same user or other photographers have captured spherical images, then the method can consider the image to more likely be a spherical image.

In some implementations, the method can analyze altitude data associated with the image, e.g., retrieved from the image metadata. The altitude data can indicate an altitude at which the image was captured (or created, modified, etc.). If the altitude data is within a stored predetermined altitude range, or is above or below stored predetermined altitudes, then the image can be considered more likely to be a spherical image. For example, if the image was captured or created at an extreme altitude, such as a higher altitude of mountains or lower altitude of sea-level (e.g., the image altitude is above or below a list of stored predetermined altitudes, or the image altitude is the same or is within a threshold range of one or more predetermined altitudes), then the method can consider the image to more likely be a spherical image than if the image were captured at different, more commonly-visited altitudes (e.g., more commonly visited for daily activities of the user and/or other users or persons, etc.). For example, the higher or lower altitudes can indicate that the image was taken at a location desirable for a panoramic photo and/or outside the common altitudes travelled to by the user.

In some implementations, the method can analyze time data (e.g., time and date) associated with the image, e.g., retrieved from the image metadata. The time data can indicate a time of capture of the image (or indicate another associated time, e.g., time of image creation or modification, etc.). In some examples, the method can compare the image time data to one or more predetermined time ranges that indicate more likelihood of a spherical image to determine whether the image time data falls within the one or more predetermined time ranges. For example, in some implementations, if the image was captured late at night, the method can consider the image to be less likely to be a spherical image than if the image were captured during daylight hours, since many or most spherical images may be panoramas of scenery in daylight, or may have been captured in daytime or evening hours.

In some implementations, two or more of the location data, altitude data, and time data can be combined to determine a more certain or higher probability that the image is a spherical image. For example, if location data indicates that the image was captured at a tall monument or the highest point nearby, and the altitude data indicates that the image was captured at a higher elevation at that location (e.g., 100 feet or more higher than an average ground level within a predetermined radius of that location), then the likelihood of a spherical image can be increased. For example, this may indicate that the user is at the top of a monument or platform and is more likely to take a spherical image with a better view that such a vantage point can provide. Similarly, other types of data examined in method 400 can be combined with various other data to determine whether it is more likely that the image is spherical.

In some implementations, the method can examine user-related metadata that may be associated with the image or associated with a user who is associated with the image. For example, such user data can be obtained (e.g., with the user's permission) from a user's device and/or user account in an online network service. Such user data can include one or more user preferences, a history of user locations (e.g., sensed by a device on the user's person), calendar data for the user indicating events of note, user activity data describing one or more activities of the user (e.g., whether the user has taken spherical images in the past, indicating more likelihood of continued capture of spherical images by the user), social user data (e.g., messages to and from other users, shared content with other users, rankings of content made by the user, etc.), the user's photography background (e.g., whether the user is a professional photographer, potentially indicating greater likelihood of spherical image capture), etc. For example, such user data can further indicate whether the user has traveled to particular locations or attended particular events at the time that the image was captured, which is some implementations may indicate a special occasion worthy of capturing a spherical image.

In some implementations, the method can also examine pixels of the image in block 410. For example, some implementations can perform examination of pixel characteristics using less processing and/or time than the examination of pixel characteristics in FIG. 5 as described below, thus allowing a faster determination of a candidate spherical image at this stage of the method. In some examples, the method can examine the brightness and/or color of the image (e.g., the brightness or color average over the entire image, and/or a distribution of brightnesses or colors) to determine whether the image was captured indoors (e.g., darker brightnesses and/or standard colors for furniture, walls, windows, etc.) or outdoors (e.g., particular hues and or brightnesses for sunny, overcast, rainy weather, etc.), where an outdoor image is more likely to be a spherical image than an indoor image. In some examples, the method can also examine image resolution (e.g., higher resolution indicating a spherical image more likely), content recognition (e.g., colors and edges indicating a sky, lake, mountain, forest, or other outdoor features and thus indicating an outdoor image, or detection of faces indicating less likelihood of spherical image that may generally be landscapes), etc. For example, content recognition can be performed using image recognition techniques as described below. In some implementations, for example, content recognition (and/or image recognition techniques) performed at this stage can be simpler and/or faster to process by a system than content recognition (and/or image recognition techniques) performed in FIG. 5. Image metadata such as image descriptor labels can also be examined, e.g., labels describing the content of the image. Such labels can be added by users or provided from image recognition techniques as described herein. For example, labels describing a scenic location and/or holiday or vacation activities, such as "mountains," "lake," "canyon," "vacation," etc., can be considered to indicate a greater likelihood of a spherical image than other labels describing indoor, social, or local activities or objects, e.g., "birthday," "party," "vehicle," "friends," etc.

In some implementations, the method can examine multiple factors, e.g., one or more of the different types of metadata (and other data) described above, to determine a likelihood that the image is a spherical image. For example, some implementations of the method can determine individual scores for one or more of the factors for different types of metadata and other data, and/or for factors based on the geometric characteristics described above. The method can determine a total candidate (confidence) score indicating a likelihood of a spherical image based on the individual scores. For example, each different factor can be assigned its own individual score, and the individual scores can be summed or otherwise combined to determine the total candidate score. In some implementations, the method can assign different weights to the scores for different types of factors to indicate that one or more of the factors is more important in determining whether the image is a spherical image and so should contribute a larger value to the candidate score. In some examples, the method can determine whether the total candidate score (and/or any of the individual scores) satisfies a predetermined candidate threshold (e.g., is greater than a predetermined candidate threshold) to indicate that the image is a candidate spherical image, while a total candidate score that does not satisfy the threshold is considered to indicate an image that is not spherical.

Thus, in some implementations, block 410 can take into account the data from one or more metadata fields of the image, associated user data, and/or geometric characteristics (e.g., if using a candidate score) to determine whether the image may possibly be a spherical image. If such data indicates that the image is not a spherical image, then the method continues to block 406 to designate the image as a non-candidate image, and can return to block 306 of FIG. 3, e.g., as the next block of method 300. If the data indicates that the image is a possible spherical image, then in block 412, the method designates the image as a candidate spherical image. The method then returns to block 306, e.g., as the next block of method 300.

In some implementations, method 400 can examine several characteristics of the image using processes that are faster and/or simpler than processes used for method 500 (described below). For example, some implementations of method 400 can check data such as metadata without analyzing the values of pixels in the image. Some implementations of method 400 can perform operations that are not processing-intensive (e.g., can be completed in under a threshold time). In some implementations, this processing may be sufficient to eliminate an image from further consideration as a spherical image. If performed before more costly processing in terms of time and/or resources, this processing can potentially save processing time and/or resources.

In some implementations, one or more of the above blocks can be omitted. Some implementations can omit method 400 and process images in methods 300 and 500. In other implementations, one or more of the blocks in method 400 can be performed in method 500 of FIG. 5, described below.

Figure 5:
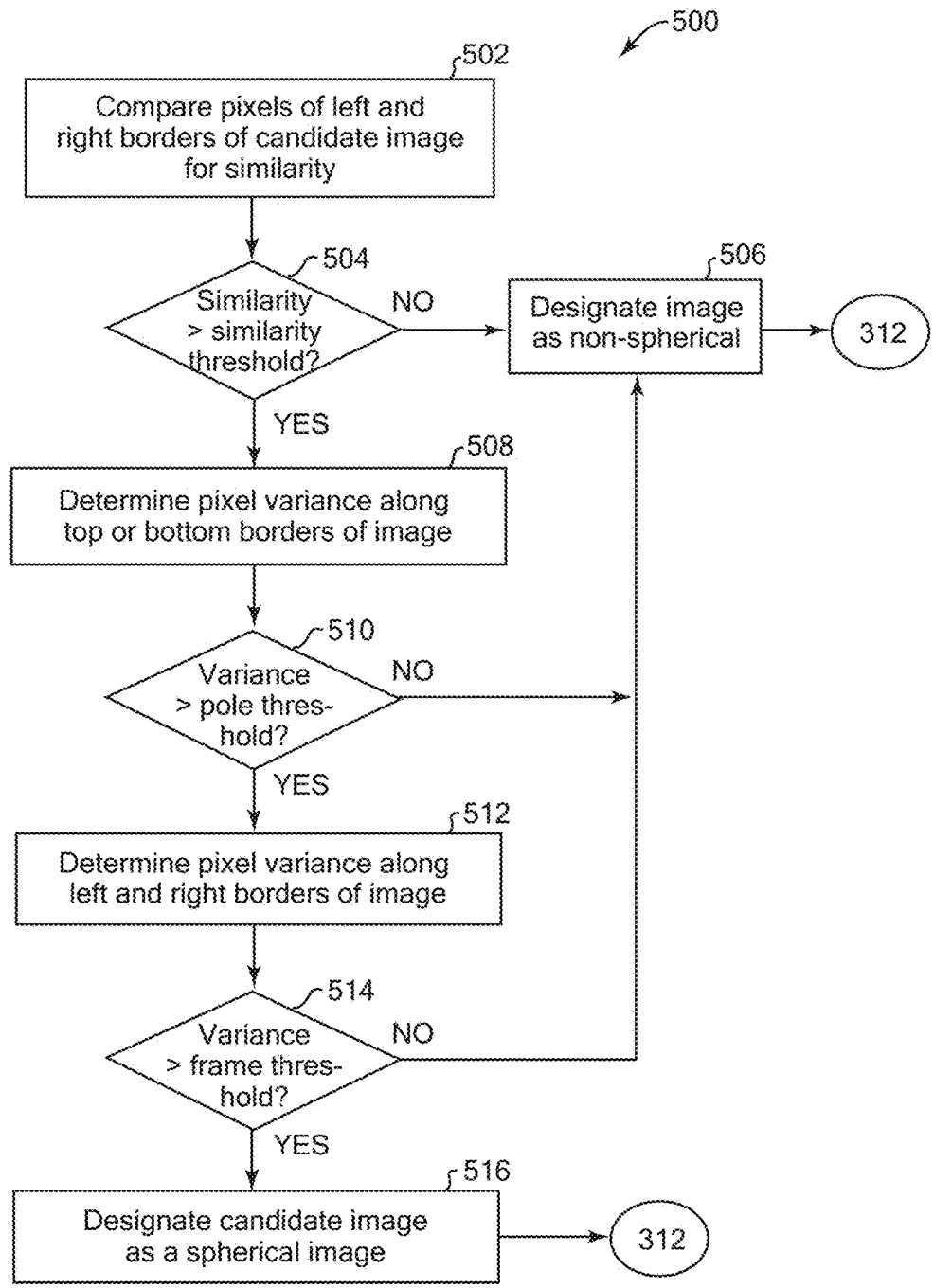
FIG. 5 is a flow diagram illustrating an example method for examining and analyzing pixels of a candidate spherical image to determine if the image is a spherical image, according to some implementations.

FIG. 5 is a flow diagram illustrating an example method 500 implementing block 310 of FIG. 3, in which the method examines and analyzes pixels of the candidate spherical image to determine if the candidate spherical image is a spherical image. In some implementations, the method examines pixel values of the image in method 500 to determine with more certainty that the candidate spherical image is a spherical image. For example, one or more factors can be examined which can contribute to the determination of whether the image is spherical. Examples of such factors are described below with reference to blocks 502-514. The example blocks of method 500 are described with reference to a type of spherical image that is an equirectangular projection. Other types of spherical images can be processed using similar blocks appropriate to those types.

In block 502, the method compares pixels of the left and right borders of the image for similarity. In some implementations, these corresponding borders are joined in a spherical display, thus indicating an image seam. In some examples, a predetermined number of corresponding pixels along each border can be examined, e.g., one or more pixel values are compared at the left and right ends of a horizontal pixel row of the image, for a predetermined number of rows and/or rows at predetermined positions of the image. In some examples, the pixel values can be color values of the pixels (e.g., all three RGB values, or a subset of the RGB values, or values of other color models, e.g., CMYK, HSV, HSL, etc.). For example, spherical images may have matching colors for corresponding pixels at their left and right image borders (e.g., pixels on the same row), or very similar colors for their left and right image borders. This is because a spherical image can be wrapped on the surface of a sphere, such that the left and right borders are joined together. For this join to be indistinguishable to a viewer, left and right borders can appear continuous in color when joined together. In some implementations, the method can compare the colors of these image borders and determine a similarity measure using any of various techniques. For example, the method can compare the colors of the pixels at the left and right image borders using a mean square pixel difference as the similarity measure. In some implementations, image textures at the left and right borders can be compared using Gabor wavelets, local binary patterns, a histogram of gradients, etc., to provide a similarity measure. Some implementations can compare the border colors using statistical data derived from color histograms to provide a similarity measure.

In block 504, the method checks whether the similarity of the left and right borders satisfies a similarity threshold. For example, the method can determine whether a similarity measure determined in block 502 is greater than the similarity threshold. The similarity threshold can be a predetermined threshold value (or level, etc.) for the particular technique(s) used in determining the similarity measure. The similarity threshold can be determined empirically, in some implementations, e.g., derived from observations by persons as to how similar two pixels of particular values appear, and/or by observations as to how distinguishable a discontinuity appears between two pixels based on their values. In some examples, a similarity measure less than the similarity threshold indicates that the left and right borders are not sufficiently similar to be joined in a spherical image, causing the method to continue to block 506 and designate the image as non-spherical, and then, e.g., return to block 312 as the next block of method 300 of FIG. 3. A similarity measure greater than the similarity threshold can indicate that the left and right borders are sufficiently similar and indicate that the image is possibly a spherical image. In this case, the method continues to block 508. Other implementations can check for satisfying the similarity threshold in other ways, e.g., less than the threshold, within a particular range, etc.

In block 508, the method determines the pixel color variance (and/or other pixel value variance) at the top or the bottom of the image. For example, a predetermined number of horizontal rows of pixels at the top or the bottom of the image can be examined. Some types of spherical images may collapse to a pole at the top and bottom of the image, where a single pixel on the 3D sphere is stretched over a whole pixel row in the rectangular 2D image, or a few pixels on the sphere are stretched over the whole pixel row. This is because the top and bottom rows of the rectangular display of the spherical image may be compressed into a point or small ring at the top and bottom of the sphere, respectively. Thus, only one or a few pixel color values may be copied along the top and bottom rows of a spherical image. In some implementations, the pixel variance measured along a row of the image is a measure of how much the row pixels vary in color. A small variance can indicate that the image is more likely to be a spherical image, as described below. Some implementations can examine both the top and bottom rows of the image for greater robustness. The variance can be determined using any well-known techniques, e.g., mean squared distance from the mean of pixel values.

In block 510, the method checks whether the pixel color variance along the top or bottom row of the image satisfies a pole threshold, e.g., is less than the pole threshold. In some implementations, the pole threshold is a predetermined horizontal variance threshold that has been determined to indicate sufficient variance in the top or bottom image pixel rows to indicate the image is more likely (or not) to be a spherical image. For example, a variance greater than the pole threshold can indicate that the pixels sufficiently vary in color in the top or bottom rows examined to indicate a non-spherical image, and so the method continues to block 506 to designate the image as non-spherical. A variance less than the pole threshold indicates that the pixels do not much vary in color and so the image is possibly a spherical image. In this case, the method continues to block 512. In implementations checking both top and bottom rows, if either top row(s) or bottom row(s) do not satisfy the pole threshold (e.g., are greater than the pole threshold), the image can be disqualified as a spherical image.

In block 512, the method determines a pixel value variance along the left and right borders of the image. In some implementations, pixel color value variance can be determined. For example, a predetermined number of vertical columns of the image at the left and right borders can be examined for color variance among the pixels of each column. In some implementations, this block can be performed to examine whether the image has a solid- or mono-colored border, such as a border frame added to the image during image processing or at some other previous stage. For example, a frame added to the image may satisfy the checks for spherical image performed in blocks 504 and 510 described previously, which may be a false positive indication of a spherical image. In spherical images without any such frame, the left and right borders of the image may exhibit some pixel color variation along a column of pixels due to various captured features of the image along the vertical length of the column (e.g., differing features along the column length such as sky, horizon, ground, etc.), which can be unlike a frame. In some implementations, only one of the left and right borders can be examined in block 512. In some implementations, other pixel values besides color can be examined for variance, e.g., brightness.

In block 514, the method checks whether the pixel value variances detected at the left and right borders in block 512 satisfy a frame threshold, e.g., are greater than a frame threshold to indicate more likelihood of a spherical image. In some implementations, the frame threshold can be a predetermined vertical variance threshold that has been determined to indicate likelihood (or not) that a frame exists at the borders of the image. For example, a variance less than the frame threshold can indicate that the left and right borders do not vary sufficiently in color and may be part of a frame, and the method continues to block 506 to designate the image as non-spherical. A variance greater than the frame threshold can indicate likelihood that the left and right borders are part of a natural scene captured in the image and that no frame is present at borders of the image. In this case, the method continues to block 516.

In block 516, the method designates the candidate image as a spherical image. Thus, the candidate image has met the criteria examined in the blocks of method 500, and has enough pixel characteristics similar to a spherical image to be classified as one. The method can then return to block 312, e.g., as the next block of method 300 of FIG. 3.

In some implementations, each of the image characteristic examination blocks 502, 508, and 512 can determine or contribute an individual score to an overall evaluation or confidence score. For example, instead of evaluating each characteristic with blocks 504, 510, and 514, the method can compare the overall score in block 516 to a predetermined score threshold to determine whether the image is a spherical image. If the overall score satisfies the score threshold, the image can be considered a spherical image, and if the overall score does not satisfy the score threshold, the image can be considered a non-spherical image. For example, if the overall score is greater than the score threshold, the image is considered a spherical image, and if the overall score is less than the threshold, the image is considered a non-spherical image. Some implementations can combine one or more individual scores used for various factors in method 400 and method 500 into a total score that represents contributions from all or some factors used for evaluation in methods 400 and 500. Some implementations can weight each factor contribution according to its type as indicated by predetermined weights assigned to each type of factor, e.g., based on an importance of each of the factors to spherical image determination.

In various implementations of the examination of pixels in blocks 502, 508, and/or 512, the method can examine a different amount of pixels along the borders of the image. For example, in blocks 502 and/or 512, the method can examine a greater number of pixels in the leftmost or rightmost column, and/or can examine a greater number of columns of pixels at the left and right borders to increase robustness of the evaluation. Similarly, in block 508 the method can examine a greater number of pixels in a row at the top or bottom, and/or can examine a greater number of pixel rows at the top and/or bottom of the image to increase robustness of the evaluation. Various implementations can reverse the direction of evaluation with respect to various threshold examples described herein, e.g., where a value at the opposite side of a threshold indicates the described result.

In other implementations, alternative or additional techniques can be used to examine the pixels and determine whether the image is potentially a spherical image. For example, the method can use geometric analysis of image characteristics such as the pixel colors (or other pixel values) in the image to attempt to determine whether properties are exhibited similar to a spherical image. In some examples, the geometric analysis can examine edges of color values of pixels and how those edges are oriented in the image, e.g., using edge detection techniques. An "edge" as referred to herein is a discontinuity or larger change in color value (or other value) from one pixel to an adjacent pixel in an image, as opposed to a smoother, smaller change in color values in adjacent pixels (e.g., as in a gradient). For example, some straight edge lines in a scene captured in a spherical image may appear curved or warped in the 2D rectangular form of the spherical image, and these lines will appear straight when the image is displayed in 3D spherical form. Particular patterns of edge curvature can indicate a spherical image, e.g., if many lines are curved in similar directions or in other similar ways. In some implementations, the method can use image based machine learning techniques to similarly examine color edges in the image. For example, the method can be trained beforehand with training images that show typical curved or warping patterns or orientations of edges that appear in spherical images. The method can thus be trained to find similar patterns in new, non-training images. If such patterns are found in a new image (and/or such detections have a confidence level (e.g., similarity to the trained patterns) greater than one or more predetermined thresholds), the method can designate the image as a spherical image. In various implementations, any of these techniques can add corresponding contributions to a score indicating a greater likelihood of the image being a spherical image.

In some implementations, image recognition techniques can be used for the image pixel content to recognize or detect particular features, such as human faces, common objects (e.g., vehicles, buildings, roads, chairs, clock, etc.), landscape features (sunsets, mountains, etc.), etc. Such features can be recognized using various image recognition techniques, e.g., facial recognition techniques, landscape recognition techniques, object recognition techniques, etc. For example, some of these techniques can compare portions of the image (or detected features in the image) to model objects or patterns to determine whether matches exist that indicate recognized features. In some implementations, such recognition techniques can be performed in method 400 of FIG. 4 and/or method 500 of FIG. 5. In some examples, particular recognized features found in the image, e.g., scenic landscapes (mountains, forests, lakes, valleys, etc.), landscape or city views, etc., can indicate a greater likelihood of a spherical image, and can weight or bias the image closer to being a candidate spherical image (e.g., in method 400) and/or closer to being a spherical image (e.g., in method 500).

In some implementations, if the obtained image can be a spherical component image that is a portion of a full spherical image, then some blocks described above may not be appropriate for such component images and can be omitted. For example, blocks 402 and 404 of method 400 can check for a full spherical image aspect ratio, and the blocks of method 500 can examine pixel characteristics of a full spherical image. Such blocks can be omitted if the method 200 or 300 detects that an obtained image is a spherical component image, e.g., by examining metadata such as offset or dimension metadata indicating a spherical component status. In some implementations, such blocks can determine whether a particular aspect ratio and/or other characteristics are present for a standard spherical component image. Some techniques, such as one or more of the alternative or additional techniques described above, may be able to be used in some implementations for spherical component images, such as using edge detection to check for spherical image characteristics.

In some implementations, one or more of the above blocks of method 500 can be omitted. In addition, some implementations can omit method 500 entirely, such that every image qualifying as a candidate image in method 400 is designated to be a spherical image. In some implementations this may increase the possibility that some images would be rendered inappropriately as spherical images. In other implementations, one or more of the blocks in method 500 can be performed in method 400.

It should be noted that the blocks described in the methods described herein can be performed in a different order than shown and/or simultaneously (partially or completely) with other blocks, where appropriate. Not all of the described blocks need be performed in various implementations. In some implementations, blocks can occur multiple times, in a different order, and/or at different times in the methods. In some implementations, the methods can be implemented, for example, on a server system 102 as shown in FIG. 1. In some implementations, one or more client devices can perform one or more blocks instead of or in addition to a server system performing those blocks.

The methods described herein can be implemented by program instructions or code, which can be executed on a computer, e.g., implemented by one or more processors, such as microprocessors or other processing circuitry and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more of the methods can be implemented in hardware (logic gates, etc.), or in a combination of hardware and software. One or more of the methods can be performed as part of or component of an application running on the system, or as an application or software running in conjunction with other applications and operating system.

FIGS. 6A-6F are diagrammatic illustrations of example images that can be processed using one or more features described herein to detect whether the images are spherical images. In various implementations, the images can be displayed on a display device, e.g., of a client device 120, 122, 124, and/or 126 of FIG. 1, or a server system 102 in some implementations. In some implementations, the images can be processed as described herein without being displayed. In one example, the images can be displayed in the rectangular (stored) form as shown in these FIGS. 6A-6F, and/or can be displayed in a viewing interface that displays 3D spherical images (e.g., if the image is found to be a spherical image according to features described herein). For example, any of the images can be displayed in a graphical interface on a display of a client device for viewing by a user. In these examples, the images are shown with thin black border outlines shown to clearly define the images in the figures. These outlines do not represent pixels of the images.

Figure 6A:
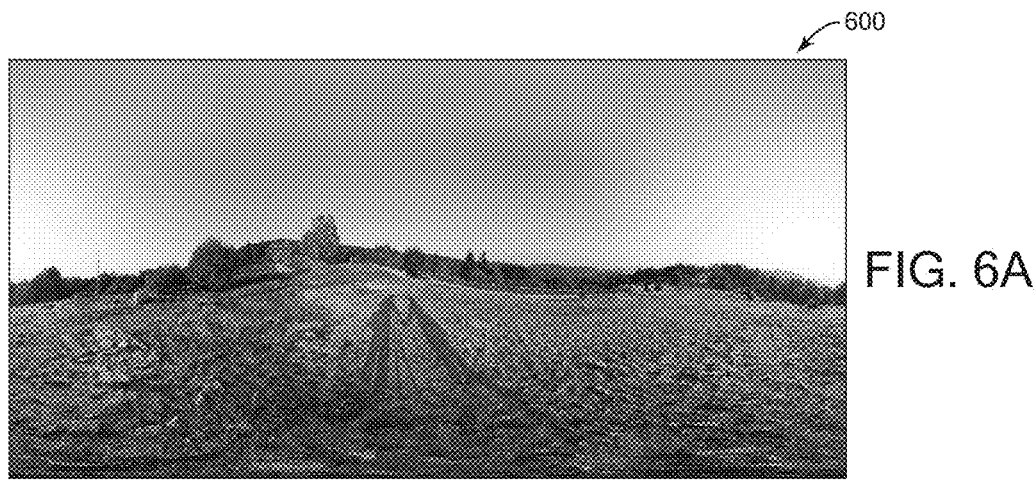
FIGS. 6A-6F are diagrammatic illustrations of examples of images which can be processed according to one or more features described herein, according to some implementations.

FIG. 6A is an example of a spherical image 600 shown in stored or rectangular form, which in this example is an equirectangular projection image. Image 600 meets all of the spherical image criteria determined and calculated in the method examples above, including having a predetermined aspect ratio (e.g., 2:1 in these examples of FIG. 6A-6F), having similar and matching left and right borders (e.g., where the left edge pixel colors continue seamlessly at the right edge), having poles indicated by top and bottom constant-value pixel rows (e.g., stretched pixel colors), and having color variance along the left and right borders indicating a natural border and not a frame border. In some implementations, image 600 can be modified to include or to reference standardized spherical panorama image metadata. In some examples, image 600 can be displayed by spherical image viewing software to provide 3D spherical views of the scene depicted in image 600.

Figure 6B:
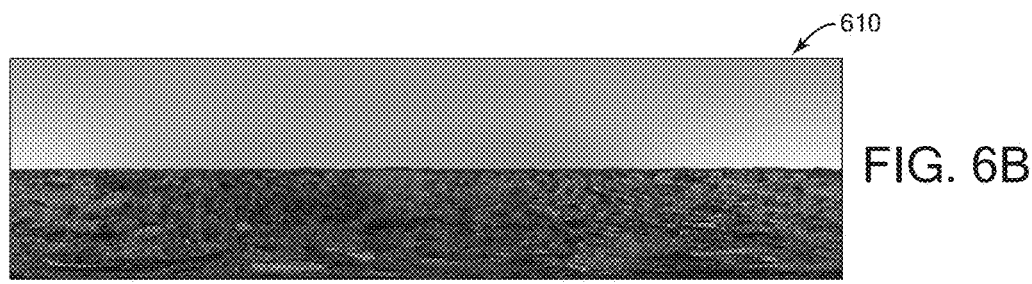

FIG. 6B is an example of an image 610 that may meet some criteria of method 500, e.g., the image 610 has similar left and right borders, has poles indicated by top and bottom constant pixel rows, and has color variance along the left and right borders indicating a natural, non-frame border. However, image 610 has a non-standard aspect ratio (e.g., greater than 2:1) that may disqualify it as a candidate spherical image in some implementations of method 400. In this example, image 610 is left unmodified by the features described herein and/or designated as a non-spherical image.

Figure 6C:

FIG. 6C is an example of an image 620 that may meet criteria of method 400 and some criteria of method 500. For example, the image 620 has a spherical-image aspect ratio, has poles indicated by top and bottom pixel rows having low variance in color, and has color variance along the left and right borders indicating a natural border. However, image 620 has dissimilar left and right borders in several sections of those borders, which may disqualify it as a spherical image in some implementations of method 500. Accordingly, image 620 can be considered a non-spherical image in this example.

Figure 6D:
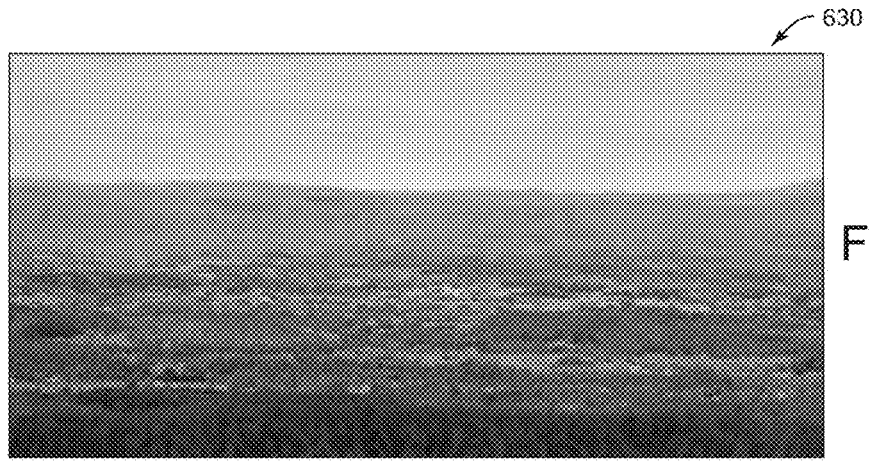

FIG. 6D is an example of an image 630 that may meet criteria of method 400 and some criteria of FIG. 500. For example, the image 630 has a spherical-image aspect ratio and has color variance along the left and right borders indicating a natural border and lack of frame. In some cases or implementations, the image 630 may also pass the check of block 504 in which the left and right borders of the image are similar, e.g., since the horizon, sky and ground areas are approximately horizontal. In some captured standard, non-spherical images, however, there can be differences at the left and right borders detectable by block 504 (e.g., even for images with flat horizon lines, due to other details in the image), and such images may not pass the check of block 504. Even if image 630 passes block 504, it may not pass block 510, in which the top or bottom borders are checked for minor variance in color. Image 630 may have detectable variance at its top border due to cloud variations and at its bottom border due to ground variations, so the lack of a pole may disqualify image 630 as a spherical image in some implementations.

Figure 6E:
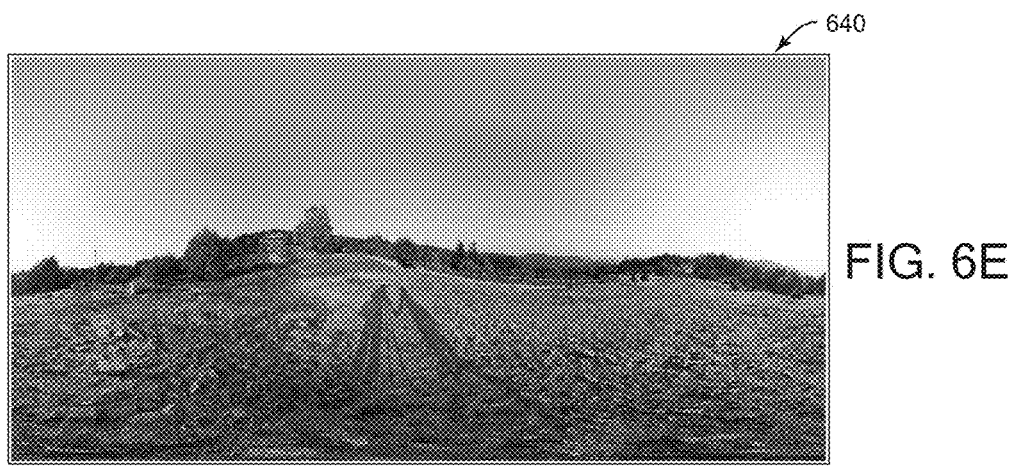

FIG. 6E is an example of an image 640 that has a light-colored frame border added to the perimeter of the image, and which meets criteria of method 400 and some criteria of FIG. 500. For example, the image 640 has a spherical-image aspect ratio, has similar left and right borders due to the frame, and has poles indicated by top and bottom pixel rows having low variance in color due to the frame. However, image 640 has no color variance along the left and right borders (again due to the frame), which may disqualify it as a spherical image in some implementations of method 500. Accordingly, image 640 can be considered a non-spherical image in this example.

Figure 6F:
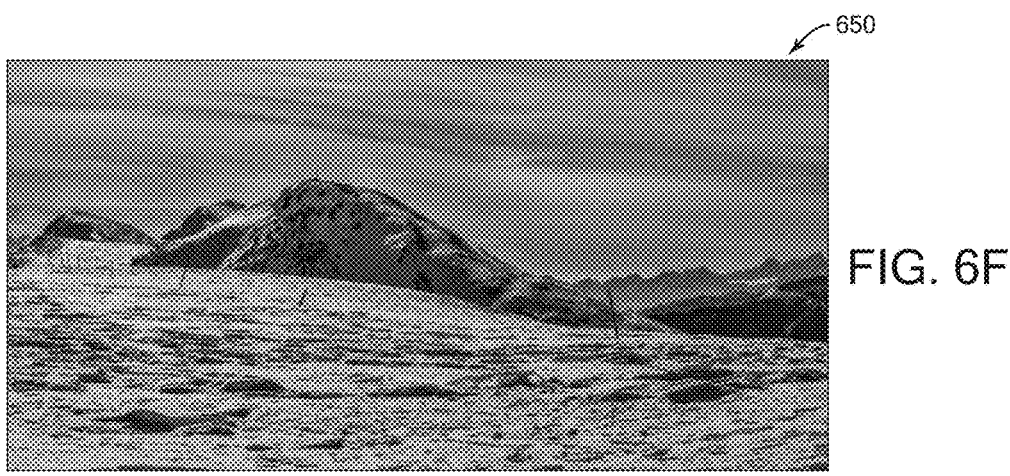

FIG. 6F is another example image 650 which can be examined to determine if it is a spherical image. The image 650 can be a candidate spherical image when processed by method 400 since it may meet the criteria checked in method 400, such as aspect ratio. However, the image 650 does not meet multiple criteria of some implementations of method 500, including similarity of left and right borders and low pixel variance of top or bottom border. Thus the image can be considered a non-spherical image in this example.

In various implementations, one or more features described herein can be used for detection of types of images other than spherical images. For example, other types of images may include projections onto non-spherical surfaces, and one or more image characteristics can be examined similarly as above, appropriate to the projection surface. For example, to detect an image that wraps around and joins into a 360-degree view (spherical or not), the image can be examined for similar left and right pixel value edges, similarly as described above for spherical images.

One or more features described herein can be used for other types of panoramic images, such as cylindrical, cubic, sinusoidal, etc. In some examples, cubic projections can be detected in a similar way to the equirectangular images described above. For example, the system can compare corresponding image borders of multiple image seams for consistency to qualify the image as a cubic image, where the corresponding borders are joined in the display of the image. For example, the borders can be examined for similar pixel values across corresponding border positions similarly as described above. In some examples, corresponding borders at five or more image seams can be compared, depending on the format of cubic projection (or fewer seams in some implementations). Various characteristics can be examined as appropriate to a particular format for cubic projections. For example, various formats can have the image sides be ordered and oriented in different connections, can have varying image aspect ratios, etc. In some example implementations, sinusoidal projections can be detected by verifying that the curved (sinusoidal) borders (e.g., of a seam) of the image have consistent imagery across these borders (e.g., similar pixel values across corresponding border positions similarly as described above) and by verifying a particular aspect ratio (e.g., a 2:1 aspect ratio). In some example implementations, Peirce-quincuncial projections can be detected by verifying consistent imagery (e.g., similar pixel values) across corresponding borders of one or more seams of the image, as well as a particular aspect ratio (e.g., a 1:1 aspect ratio). Various other characteristics of other types of panoramic images can also be examined similarly as described above with respect to spherical images, to assist in determining whether the image is of a particular type. For example, such characteristics can include geometry, metadata of the image, user data associated with the image, etc., similarly as described above.

Figure 7:
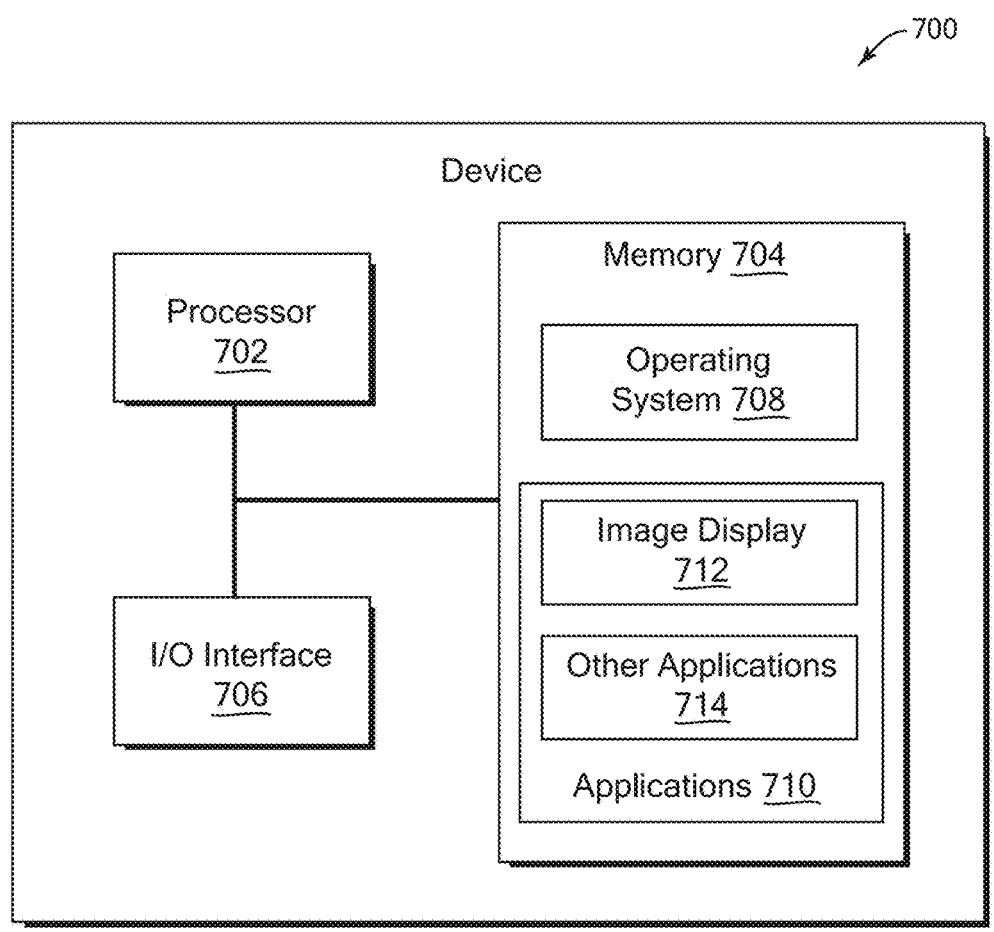
FIG. 7 is a block diagram of an example device which may be used for one or more implementations described herein.

FIG. 7 is a block diagram of an example device 700 which may be used to implement some implementations described herein. In some implementations, device 700 may be used to implement a server device, e.g., server device 104 of FIG. 1, and perform appropriate method implementations described herein. Server device 700 can be any suitable computer system, server, or other electronic or hardware device. For example, the server device 700 can be a mainframe computer, desktop computer, workstation, portable computer, or electronic device (portable device, cell phone, smart phone, wearable device (e.g., watch, pin, jewelry, clothing, etc.), tablet computer, television, TV set top box, personal digital assistant (PDA), media player, game device, etc.). In some implementations, server device 700 includes a processor 702, a memory 704, and input/output (I/O) interface 706.

Processor 702 can be one or more processors, microprocessors, or processing circuits to execute program code and control basic blocks of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708 and one or more applications engines 710. In some implementations, the applications engines 710 can include instructions that enable processor 702 to perform the functions described herein, e.g., some or all of the methods of FIGS. 2-5, display of spherical images, etc. For example, the application engines 710 can include one or more image display engines 712, including an application to display spherical images on a display component of the device. A spherical image display application, for example, can provide a displayed user interface responsive to user input to display different portions of a spherical image, e.g., rotate the spherical image to different portions within a window based on user directional commands via displayed buttons in the graphical user interface or other commands. Other applications or engines 714 can also or alternatively be included in application engines 710, e.g., a graphics or image editing applications, communication applications, web hosting engine or application, social networking engine or application, etc. Any of software in memory 704 can alternatively be stored on any other suitable storage location or computer-readable medium. In addition, memory 704 and/or other connected storage device (s) can store images, their metadata, various threshold values, and other instructions and data used in the features described herein. Memory 704 and any other type of storage (magnetic disk, optical disk, magnetic tape, or other tangible media) can be considered "storage devices."

I/O interface 706 can provide functions to enable interfacing the server device 700 with other systems and devices. For example, network communication devices, storage devices such as memory and/or database 106, and input/output devices can communicate via interface 706. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 7 shows one block for each of processor 702, memory 704, I/O interface 706, and software blocks 708 and 710. These blocks may represent one or more processors or processing circuitries, operating systems, memories, I/O interfaces, applications, and/or software modules. In other implementations, server device 700 may not have all of the components shown and/or may have other elements including other types of elements instead of, or in addition to, those shown herein. While system 102 is described as performing blocks (e.g., operations) as described in some implementations herein, any suitable component or combination of components of system 102 or similar system, or any suitable processor or processors associated with such a system, may perform the blocks described.

A client device can also implement and/or be used with one or more features described herein, such as any of client devices 120-126 shown in FIG. 1. Example client devices can include some similar components as the device 700, such as processor(s) 702, memory 704, and I/O interface 706. An operating system, software and applications suitable for the client device can be provided in memory and used by the processor, such as image display and editing software, client communication application software, etc. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the images per- and post-processing as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text.

One or more methods disclosed herein can operate in several environments and platforms, e.g., as a stand-alone computer program that can run on any type of computing device, as a web application having web pages, as a mobile application ("app") run on a mobile computing device, etc.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, or a user's past or current geographic locations). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although blocks (e.g., steps, operations, or computations) may be presented in a specific order, the order may be changed in different particular implementations. In some implementations, multiple steps or operations shown as sequential in this specification may be performed at the same time.

What is claimed is:

1. A computer-implemented method comprising:
   obtaining an image;
   examining at least one characteristic of the image;
   determining whether the at least one examined characteristic satisfies one or more particular criteria that indicate that the image has a spherical image type; and
   in response to determining that the at least one examined characteristic satisfies the one or more particular criteria, modifying metadata associated with the image to indicate that the image has the spherical image type and to indicate that the image has image content formatted for spherical display by one or more display devices.

2. The method of claim 1 wherein, prior to the modifying of the metadata, the image is unassociated with information specifying that the image has the spherical image type.

3. The method of claim 1 wherein examining at least one characteristic includes examining at least one visual characteristic of pixels of the image.

4. The method of claim 3 wherein examining the at least one characteristic includes comparing a similarity of pixel values of pixels at a left border and a right border of the image, and wherein determining whether the at least one examined characteristic satisfies the one or more particular criteria includes determining whether the similarity of pixel values of the left border and the right border of the image meets a similarity threshold.

5. The method of claim 1 wherein examining the at least one characteristic includes examining a pixel value variance along a top border or a bottom border of the image, and wherein determining whether the at least one examined characteristic satisfies the one or more particular criteria includes determining whether the pixel value variance meets a horizontal variance threshold.

6. The method of claim 1 wherein examining the at least one characteristic includes examining pixels of the image to find edges of pixel values, and
   wherein determining whether the at least one examined characteristic satisfies the one or more particular criteria includes determining whether the edges of pixel values are similar to one or more predetermined orientations or patterns of edges of pixel values indicating that the image has the spherical image type.

7. The method of claim 1 wherein examining the at least one characteristic includes measuring a pixel value variance along at least one of a left border and a right border of the image, and
   wherein determining whether the at least one examined characteristic satisfies the one or more particular criteria includes determining whether the pixel value variance meets a vertical variance threshold.

8. The method of claim 1 wherein examining at least one characteristic includes:
   determining whether the image is a candidate spherical image by examining non-pixel characteristics of the image; and
   examining one or more characteristics of pixels of the image in response to determining that the image is a candidate spherical image, wherein the one or more characteristics of pixels are used to determine whether the image has the spherical image type.

9. The method of claim 1 wherein examining at least one characteristic of the image includes examining an aspect ratio of the image, and
   wherein determining whether the at least one examined characteristic satisfies the one or more particular criteria includes comparing the aspect ratio of the image with one or more stored predetermined aspect ratios associated with the spherical image type.

10. The method of claim 1 wherein examining at least one characteristic includes examining one or more metadata fields of the image, the one or more metadata fields including a camera field indicating a make or model of a camera that captured the image, and wherein determining whether the at least one examined characteristic satisfies the one or more particular criteria includes comparing the make or model of the camera to a stored list of camera makes and models that have an ability to capture or create images that have the spherical image type.

11. The method of claim 1 wherein examining at least one characteristic includes examining a location field of the image indicating an image location where the image was captured, and comparing the location field to one or more geographic locations, and
wherein determining whether the at least one examined characteristic satisfies the one or more particular criteria includes determining whether the image location is different than the one or more geographic locations.

12. The method of claim 1 wherein examining at least one characteristic includes examining an altitude field of the image indicating an image altitude at which the image was captured, and
wherein determining whether the at least one examined characteristic satisfies the one or more particular criteria includes determining whether the image altitude is higher or lower than the one or more stored predetermined altitudes.

13. The method of claim 1 wherein examining at least one characteristic includes examining a time field of the image indicating an image time at which the image was captured, and
wherein determining whether the at least one examined characteristic satisfies the one or more particular criteria includes determining whether the image time is within the one or more stored predetermined time ranges.

14. The method of claim 1 wherein the modified metadata associated with the image includes flag information identifying the image as having the spherical image type, and one or more parameters allowing the spherical display of the image.

15. The method of claim 1 further comprising, in response to determining that the at least one examined characteristic satisfies the one or more particular criteria, providing the image and the modified metadata for the spherical display of the image.

16. A system comprising:
a storage device; and
at least one processor operative to access the storage device and operative to perform operations comprising:
obtaining an image from the storage device;
examining at least one characteristic of the image;
determining that the image has a spherical image type in response to the at least one examined characteristic satisfying one or more particular criteria indicating that the particular image has the spherical image type;
determining that the particular image has a non-spherical image type in response to the at least one examined characteristic not satisfying at least one of the one or more particular criteria indicating that the particular image has the spherical image type; and
in response to determining that the image has the spherical image type, modifying metadata associated with the image to indicate that the image has the spherical image type and to indicate that the image has image content formatted for spherical display by one or more display devices.

17. The system of claim 16 wherein prior to the modifying of the metadata, the image is unassociated with information specifying that the image has the spherical image type, wherein determining that the image has the spherical image type includes determining that the image is in an equirectangular form of a spherical image, and wherein the modified metadata associated with the image includes information identifying the image as the spherical image type and one or more parameters allowing the spherical display of the image.

18. The system of claim 16 wherein the operation of examining at least one characteristic includes:
determining that the image is a candidate spherical image by examining non-pixel characteristics of the image; and
examining one or more characteristics of pixels of the image in response to determining that the image is a candidate spherical image, wherein the one or more characteristics of pixels are used to determine whether the image has the spherical image type.

19. A non-transitory computer readable medium having stored thereon software instructions that, when executed by a processor, cause the processor to perform operations including:
obtaining an image;
examining at least one pixel characteristic of a plurality of edges of the image;
determining whether the at least one examined pixel characteristic satisfies one or more criteria indicating that the image has a spherical image type; and
in response to determining that the at least one examined pixel characteristic satisfies the one or more criteria, modifying metadata associated with the image to indicate that the image has the spherical image type and has image content formatted for spherical display by one or more display devices.

20. The computer readable medium of claim 19 wherein the image is unassociated with information specifying that the image has the spherical image type, and further comprising:
determining that the image is a candidate spherical image by determining that non-pixel characteristics of the image satisfy one or more candidate criteria,
wherein the examining of at least one pixel characteristic of the plurality of edges of the image is performed in response to determining that the image is a candidate spherical image.

* * * * *